May 7, 1968 G. J. YAGUSIC 3,382,350
REVERSE COUNTING LOGIC SYSTEMS
Filed May 10, 1965
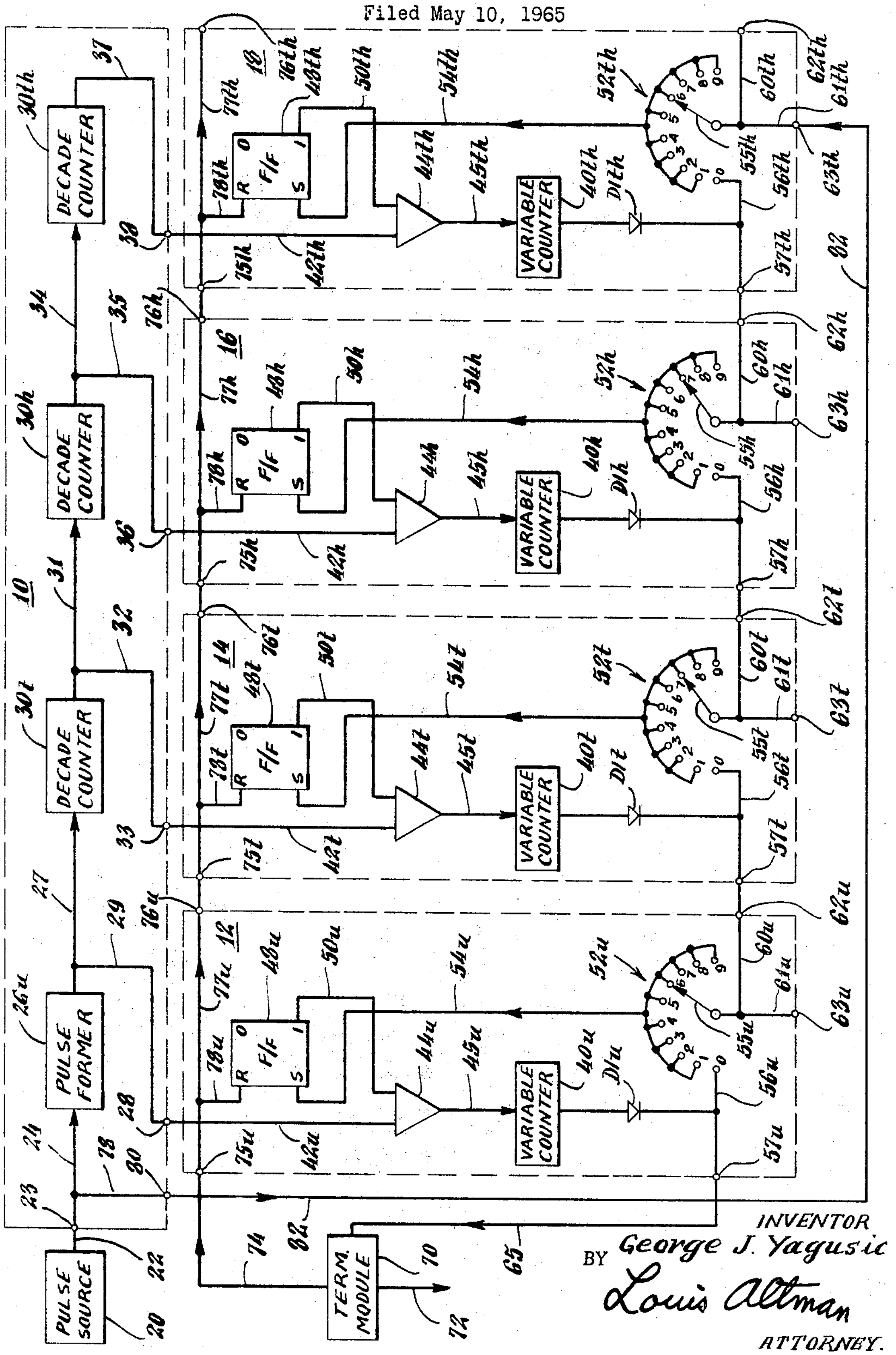
INVENTOR
George J. Yagusic
BY Louis Altman
ATTORNEY.

United States Patent Office 3,382,350
Patented May 7, 1968

3,382,350
REVERSE COUNTING LOGIC SYSTEMS
George J. Yagusic, Litchfield, Conn., assignor to General Time Corporation, New York, N.Y., a corporation of Delaware
Filed May 10, 1965, Ser. No. 454,571
19 Claims. (Cl. 235—92)

This invention relates to reverse counting logic systems for counting electrical impulses. More specifically, it relates to a system of fixed and variable magnetic counters connected in cascade to count a preset total count of electrical impulses. When the preset total count has been attained, the system provides an output which may be used in a wide variety of control applications.

In the copending application of Robert S. Lundin for "Voltage-Controlled Adjustable Counter," Ser. No. 363,361 filed Apr. 29, 1964, and assigned to the same assignee as the present invention, there is disclosed and claimed a variable magnetic counter which may be adjustably preset to any count modulus within a given range. This is accomplished by providing an adjustable supply voltage supplementing the volt-second content of the electrical pulses applied to the input winding of the variable magnetic counter. This adjustable voltage may be set at various predetermined voltage levels to vary the number of input pulses required to switch the core from one condition of magnetic saturation to its opposite condition of magnetic saturation. If the level of this adjustable supply voltage is increased, fewer input pulses are required. On the other hand, if the level of this adjustable supply voltage is decreased, a greater number of input pulses are required to switch the core.

As described in this copending application, which is incorporated herein by reference, a fixed magnetic counter and a variable magnetic counter are selectively interconnected to form a count stage. A plurality of such counting stages are cascaded together in order to form a high-count system. Each count stage is adapted to count a different digit of a multi-digit count total. When the system is adapted to count in the decimal number system, the first count stage counts the units digit of the count total, the second count stage counts the tens digit, etc. The adjustable count modulus of the variable magnetic counter connected in the units count stage is preset by appropriate selection of the adjustable voltage level so as to correspond to the units digit of the count total. As described in the aforesaid copending application, the count modulus determines the number of input pulses required to switch the core of a variable magnetic counter and provide an output pulse in an output winding linking the core. Similarly, the count modulus of the variable magnetic counter connected in the tens counting stage is preset to correspond to the tens digit of the count total. The adjustable count moduli of the variable magnetic counters connected in the higher order cascaded count stages are preset to correspond to the higher order digits of the count total.

Still referring to the aforesaid copending application, initially the units count stage is energized to count the units digit of the count total. The variable counter of the units stage is connected to the output of the fixed counter of the units stage which is a pulse former having a count modulus of one. As the units digit is being counted, the fixed and variable magnetic counters of all higher order count stages are disabled. Once the units digit is counted, the variable magnetic counter in the units stage is disabled, and the fixed and variable magnetic counters of the tens counting stage are enabled to count output pulses from the pulse former in order to count the tens digit. Then, the variable magnetic counter in the tens count stage is disabled, and the fixed and variable magnetic counters in the hundreds stage are enabled. Thus, the system progresses to the preset count total by counting the individual digits of the count total beginning with the lowest order or least significant digit through to the highest order or most significant digit. It will be seen that in order to achieve an unambiguous count total, as a lower order count stage is counting, all higher order count stages must be completely disabled. Moreover, all count stages of a lower order than the one engaged in counting are only partially enabled in that their variable magnetic counters are disabled while their fixed counters are enabled to provide the higher order digit count to the operating stage. Consequently, elaborate control circuit means are required in each count stage to enable and disable both the fixed and variable counters of each count stage in the proper sequence.

The application of Robert S. Lundin for "Reverse Counting Logic System" filed concurrently herewith, is incorporated herein by reference. That application, assigned to the assignee of the present application, discloses a high count system comprised of fixed and variable magnetic counters preferably of the type disclosed in application Serial No. 363,361. The operation of the high-count system disclosed in the second Lundin application is reversed to that disclosed in application Serial No. 363,361. That is, the highest order or most significant digit of a multi-digit count total is counted first, then the second most significant digit, etc. The least significant or lowest order digit of the multi-digit count total is counted last. Operating in this sequence, the fixed magnetic counters of the count stages need never be disabled. The reason for this is that once the fixed counters of the higher order count stages have provided the digit count satisfying the higher order digits of the count total, they cannot again provide outputs before the multi-digit count total is attained. Thus, the control circuit components required in the high-count system of application Serial No. 363,361, to sequentially enable and disable the fixed counters of the various count stages, are not required when the count sequence is reversed.

In the Lundin application, Serial No. 363,361, a ten position switch is provided in each variable counter for selecting the variable count. In the second Lundin application filed concurrently herewith, two additional switches are ganged with each variable count selector switch to provide for the situation when one or more digits of the count total are zero. One of these switches serves to connect the output of its associated variable counter to the next lower order digit count stage or to connect the output of the variable counter of the next higher order digit count stage to the next lower order digit count stage when its corresponding digit is zero. The switch of the lowest order digit count stage routes an output pulse to the input of a terminating module.

The second of these switches serves to connect the set terminal of its associated flip-flop controlling the operation of a variable counter to receive the output of a variable counter in a higher order digit count stage, or to route this output to a lower order digit count stage when corresponding digit is zero. In addition, the switch of the highest order digit count stage routes a pulse from the terminating module to the set terminal of the flip-flop in the highest order digit count stage preset to count a non-zero digit of the count total.

This second switch also serves to supply inhibiting signals to the reset inputs of the flip-flops controlling the variable counters of lower order digit count stages when the digit is other than zero.

I have discovered that the functions of these two switches may be combined to reduce the cost of producing reverse counting logic counters.

The counters disclosed in the copending application of Lundin filed concurrently herewith, further comprise OR gates each connected to the reset input of a flip-flop controlling the actuation of a variable counter. I have discovered that these OR gates may also be eliminated, further simplifying and reducing the cost of a high count reverse counting logic system.

It is therefore an object of the present invention to provide a system selectively adjustable to count any preset number of counts.

Another object of the invention is to provide a high-count capacity system of the above character using cascaded fixed count modulus and variable count modulus counters.

An additional object of the invention is to provide a system of the above character wherein fixed counters never need be disabled; thus eliminating control elements to selectively enable and disable such fixed counters.

A further object of the invention is to provide a system of the above character wherein variable counters, once enabled, need not be disabled, thus eliminating control elements to selectively disable such variable counters.

Yet a further object of the invention is to provide a system of the above character employing incremental fixed and variable magnetic counters.

A still further object of the invention is to provide a system of the above character for counting electrical pulses.

Yet another object of the invention is to provide a system of the above character which is inexpensive to produce, reliable and accurate, and which is constructed in a manner ideally suited to modularization.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawing, in which the sole figure of the drawing is a schematic circuit diagram, partially in block form, of a multi-stage thousands range high-count system constructed according to my invention.

Broadly stated, my invention provides a counting system providing an output upon the attainment of a preselectable count total. In the disclosed embodiment of my invention, the counting system is adapted to count electrical impulses or pulses in order to attain a preselected count total. The electrical pulses to be counted are developed by a pulse source and applied to a pulse former. The pulse former operates to supply corresponding pulses of uniform volt-second content to an iterative series of fixed count modulus counters connected in cascade. Each fixed counter develops an output pulse when it has received a fixed number of input pulses as predetermined by its fixed count modulus. Thus, each fixed counter is a multiplier of the number of pulses received at its input. The last fixed count modulus counter of the iterative series produces an output when the source has generated a number of pulses equal to the fixed count moduli of all the fixed counters multiplied together.

A variable count modulus counter is connectable to the output of each of the fixed counters. The last fixed counter in the iterative series develops an output which is applied to a variable counter whose adjustable count modulus is set to correspond to the highest order digit of the preset count total. Similarly, the output from the next to last fixed counter in the iterative series is selectively connected to a variable counter whose count modulus is preset to correspond to the second most significant digit of the count total, and so on. A variable counter, whose count modulus is set to correspond to the least significant digit of the count total is selecively connectable to the output of the pulse former. Electronic switching means in each count stage is selectively operated to effect the individual connection of a variable counter to the output of the fixed counter of a count stage.

It will be understood by those skilled in the art that the above-described arrangement of the counting stages is the equivalent of that disclosed in the above-identified Lundin application filed herewith. In my invention, however, prior to the initiation of each count operation, each of the individual electronic switching means (flip-flops) are uniformly conditioned to disconnect each of the variable counters from the output of their respective fixed counters. Furthermore, the first pulse generated by the pulse source at the beginning of a count operation is applied to the highest order count stage as well as to the input of the pulse former. This initial pulse from the pulse source is routed through switching means associated with each count stage to condition the appropriate one of the electronic switching means to connect the variable counter to the fixed counter providing counts of the highest order non-zero digit of the count total.

In my invention when the highest order non-zero digit of the count total has been counted, the corresponding variable magnetic counter develops an output. This is supplied through the same count stage switching means to the next lower order count stage which is to count the next lower order non-zero digit of the count total. This output pulse conditions the electronic switching means to connect the corresponding variable counter to the output of its respective fixed counter to count the next most significant non-zero digit.

In my system, after each variable counter counts the order digit to which it is assigned, it need not be disconnected from the output of its respective fixed counter. This is because a variable counter having counted a higher order digit will not again produce an output before the lowest order count stage produces an output signalling the attainment of the count total.

Thus, in my system, all counters, once enabled, remain enabled at all times during the count operation. Consequently, control circuitry is not required to disable the fixed counters or to disable each variable counter in sequence as the digits of the count total are attained.

Referring now to the sole figure of the drawing, a pulse counting system constructed according to my invention comprises a fixed counting module, generally indicated at 10, and a plurality of identically constructed variable count modules, generally indicated at 12, 14, 16 and 18. In the description to follow, the disclosed embodiment of my invention is assumed to operate according to the decimal numbering system having a radix of ten. Thus, the disclosed embodiment comprises a units count stage assigned to count the units digit of a count total. Similarly, there is a tens count stage to count the tens digit, a hundreds count stage to count the hundreds digit, and in the disclosed embodiment, a thousands count stage to count the thousands digit of a preselected multi-digit count total.

Accordingly, elements operating in the units count stage are herein given the reference suffix "*u*," elements operating in the tens count section are given the reference suffix "*t*," elements in the hundreds count section are given the reference suffix "*h*," and elements operating in the thousands count stage are given the reference suffix "*th*." Corresponding parts of the various counts stages are given corresponding reference numerals followed by the above distinguishing suffix.

A source 20 of pulses to be counted is connected by an output line 22 to an input terminal 23 of the fixed count module 10. Terminal 23 is connected by line 24 to an input of a pulse former **26*u*. Pulse former 26*u* may be constructed in the manner disclosed in the above-mentioned copending application, Serial No. 363,361. Another suitable pulse former is also disclosed in Neitzert Patent No. 2,897,380. Accordingly, the pulse former 24***u* preferably includes a saturable magnetic core having a generally square hysteresis loop. The pulses from source 20 are supplied to an input transistor operating in response thereto to pass current through an input winding about the core (not shown) of the pulse former. The core, initially in one condition of magnetic saturation, is driven beyond the opposite condition of magnetic saturation by operation of the input transistor in response to each input pulse.

After the core has been driven past saturation, a sensing winding turns on a resetting transistor to send a surge of current through a resetting winding linking the core. The core is driven to its original condition of magnetic saturation thereby inducing an output pulse in an output winding linking the core. The output pulses developed by the pulse former are of uniform volt-second content and are equal in number to the number of input pulses. Consequently, the pulse former 26*u* may be considered as a fixed magnetic counter having a count modulus of 1.

When the rate of input pulses from source 20 is quite low, it may be necessary to shape the input pulses in order to achieve the desired pulse former operation. This can be conveniently accomplished by connecting another transistor in circuit with the pulse former input transistor such that these two transistors operate in the manner of a conventional Schmitt trigger. By so doing, adequate conduction of the input transistor to fully saturate the pulse former core may always be achieved in response to each input pulse.

The output pulses formed by the pulse former 26*u* are supplied on line 27 to the input of a decade counter 30*t*. In addition, these formed output pulses are also supplied to an output terminal 28 on line 29. In practice, separate output windings linking the core of the pulse former 26*u* may be used to develop these output pulses.

The decade counter 30*t* is constructed in the same fashion as the pulse former 26*u* except that it has a count modulus of 10. It therefore takes ten input pulses from the pulse former 26*u* before the core of the decade counter 30*t* is fully saturated and reset to develop an output pulse. Thus, the input to output pulse ratio of the decade counter 30*t* is 10:1.

The formed output pulses from the decade counter 30*t* are supplied on line 31 to the input of a second decade counter 30*h*. In addition, these output pulses are supplied on line 32 to an output terminal 33. As in the case of the pulse former 26*u*, separate output windings linking the core of the decade counter 30*t* may be used to supply the pulses to output terminal 33 and to the input of the decade counter 30*h*.

Decade counter 30*h* is constructed in the same manner as decade counter 30*t*. Thus, decade counter 30*h* generates an output pulse on receipt of ten input pulses from decade counter 30*t*. The formed output pulses developed by the decade counter 30*h* are supplied on line 34 to the input of decade counter 30*th* and on line 35 to an output terminal 36.

Decade counter 30*th* is constructed in the same manner as decade counter 30*t* and 30*h* to provide an output pulse for every ten input pulses received from decade counter 30*h*. These output pulses are supplied on line 37 to an output terminal 38. It will thus be seen that decade counter 30*h* provides an output pulse for every 100 input pulses generated by the source 20 while decade counter 30*th* provides an output pulse for every 1,000 pulses generated by source 20.

Each of the variable count modules 12, 14, 16 and 18 comprise a variable magnetic counter 40. Each variable magnetic counter 40 may be constructed in the manner described in my above-noted copending application, Serial No. 363,361. Accordingly, each comprises a saturable magnetic core driven from one condition of magnetic saturation to its opposite condition by a selectably predetermined number of input pulses applied to an input winding linking the core. The required number of input pulses to effect this is determined by the voltage level of an adjustable potential source operating to supplement the volt-second content of each input pulse. The level of this adjustable potential source is increased to reduce the number of input pulses required to switch the core, or decreased to increase the number of pulses required to switch the core. In this manner, the count modulus of each counter 40 may be set to provide any desired input to output pulse ratio within a given range.

The formed output pulses supplied to output terminal 28 by the pulse former 26*u* are conducted by line 42*u* to one input of an AND gate 44*u*. When AND gate 44*u* is enabled, these output pulses are gated on line 45*u* to the input of the variable magnetic counter 40*u*. Similarly, the formed output pulses developed by the decade counter 30*t* are gated through an AND gate 44*t*, when enabled, to the input of the variable magnetic counter 40*t*. The formed output pulses supplied to output terminal 36 by the decade counter 30*h* are gated through AND gate 44*h* to the input of variable magnetic counter 40*h*. And the formed output pulses supplied to terminal 38 from decade counter 30*th* are gated through AND gate 44*th* to the input of the variable counter 40*th*.

The AND gates 44 of the variable count modules 12, 14, 16 and 18 are selectively enabled according to the condition of flip-flops 48. Referring specifically to variable count module 12, the set output of flip-flop 48*u* is connected by line 50*u* to an input of AND gate 44*u*. When flip-flop 48*u* is in its set condition, AND gate 44*u* is enabled to pass pulses from the counting chain module 10 to the input of the variable counter 40*u*. On the other hand, if flip-flop 48*u* is reset, AND gate 44*u* is disabled and pulses from the counting chain module 10 are not gated through to the variable magnetic counter 40*u*. Similarly, the set output of each of the flip-flops 48 in the other variable count modules is supplied on a line 50 to selectively enable the respective AND gate 44.

A multi-position switch 52, in each count stage, functions to route a pulse from the next higher order count stage on a line 54 to the set input of the flip-flop 48. Each multi-position switch 52 is provided with contacts 0 through 9. A switch arm 55 of each switch 52 is ganged to the switch arm of the count selector switch of its count stage variable counter 40, as indicated at 51. As specifically disclosed in the aforesaid copending application, Serial No. 363,361, the count selector switch is manipulated to preset the adjustable voltage supply level and thus, the count modulus of the variable counters 40. Thus, the condition of each switch 52 is set according to the position of the count selector switch of that count stage's variable counter. Switch contacts 1 through 9 are electrically connected in common to supply set pulses over line 54 to the set input of the flip-flop 48. The zero contact of each switch 52 is connected over a line 56 to an output terminal 57. In each variable count modules, an output developed by the variable counter 40 is applied through a diode D1 to line 56 and output terminal 57. The switch arm 55 of each switch 52 is connected over lines 60 and 61 to input terminals 62 and 63, respectively.

The output terminl 57*u* of variable count module 12 is connected by a conductor 65 to the input of a terminating module 70. The terminating module 70 is preferably constructed in the manner disclosed in the aforesaid copending application, Serial No. 363,361. As will be seen from the above description, when the number of the pulses generated by the source 16 equals the preset count total, an output pulse occurs at output terminal 57*u*. As described in the above-noted copending application, the terminating module 70 responds to this output pulse to develop an output pulse on line 72 indicating that the preset count total has been achieved by the system. The terminating module preferably comprises pulse stretching means providing an output pulse of adequate time duration to perform a desired control function.

The terminating module preferably further comprises circuit means for resetting all the saturable cores of the magnetic counters in preparation for the next counting cycle. Furthermore, terminating module 70 comprises automatic and manually initiated circuit means for generating a reset pulse supplied on line 74 to an input terminal 75*u* of the variable count module 12. Input terminal 75*u* is connected to an output terminal 76*u* by line 77*u*. Line 77*u* is connected to the reset input of the flip-flop 48*u* by line 78*u*. The reset pulse generated in the terminating module 70 thus resets flip-flop 48*u*. The identically constructed modules 14, 16 and 18 are cascaded with module 12 such that their lines 77 form a common reset bus. As a result, the reset pulse generated in the terminating module 70 simultaneously resets each of the flip-flops 48. Thus, prior to the initiation of a count cycle, all of the flip-flops 48 are reset to disable their respective AND gates 44. The manual reset (not shown) is provided in case a count is interrupted or to insure that all flip-flops 48 are reset when the system is initially energized. Consequently, none of the variable counters 40 may receive formed inputs from the fixed counting chain module 10 until the highest order non-zero variable counter is enabled by the first count pulse on line 78.

To this end, the output terminal 57*t* of module 14 is connected to the input terminal 62*u* of module 12. Similarly, the output terminal 57*h* is connected to the input terminal 62*t*, while the output terminal 57*th* is connected to the input terminal 62*h*. The pulses generated by the pulse source 20 supplied on line 22 to the input terminal 23 of the counting chain module 10 are routed over a line 78 to an output terminal 80. Output terminal 80 is connected by line 82 to the input terminal 63 of the highest order count stage; in the disclosed embodiment terminal 63*th* of module 18 of the thousandths counting stage.

In describing an operation of the disclosed embodiment of the invention, it will be assumed that the preset total count is 6,776. This preset total count is indicated by the position of the switch arms 55 of the switches 52 in the respective count stages. Initially all the flip-flops 48 are reset by a reset pulse generated on line 74 from the terminating module 70. The first pulse generated by the source 20 is supplied on line 82 and routed through switch 52*th* to set flip-flop 48*th*. Consequently, AND gate 44*th* is enabled to pass pulses from the decade counter 30*th* to the input of the variable counter 40*th*.

Since the thousands digit of the count total is 6, the count modulus of the variable counter 40*th* is preset to 6. For every thousand pulses generated by the pulse source 20, the decade counter 30*th* will develop a single output pulse. After 6 thousand pulses, the decade counter 30*th* will have developed six output pulses to drive the saturable core of the variable counter 40*th* beyond its opposite condition of magnetic saturation. As the core of variable counter 40*th* is reset, an output pulse is developed in an output winding linking the core. This output pulse is passed through diode D1*th* to line 56*th* and output terminal 57*th*. It is supplied to input terminal 62*h* of module 16 and routed through switch 52*h* to set flip-flop 40*h*. At this time, magnetic variable counter 40*h* is connected to the output of decade counter 30*h* through the now enabled AND gate 44*h*. Decade counter 30*h* supplies an output pulse for every hundred input pulses in excess of 6,000 generated by the pulse source 20 through enabled AND gate 44*h* to the input of variable counter 40*h*.

After seven hundred output pulses, the variable counter 40*h* produces an output pulse that is passed through diode D1*h* to output terminal 57*h*. This output pulse is routed through switch 52*t* to set flip-flop 48*t*. At this time, AND gate 44*t* is enabled to gate output pulses developed by decade counter 30*t* to the input of variable counter 40*t*. After 70 more pulses are generated by the pulse source 20, variable counter 40*t* generates an output pulse. This is passed through diode D1*t* and routed through switch 52*u* to set flip-flop 48*u*. AND gate 44*u* is now enabled to pass pulses formed by the pulse former 26*u* to the input of the variable counter 40*u*. After six more pulses, variable counter 40*u* generates an output pulse. This is passed through diode D1*u* to output terminal 57*u* and over line 65 to the input of the terminating module 70 signalling the achievement of the preset count total.

It should be noted that throughout the counting operation, none of the decade counters 30 are ever required to be disabled. Moreover, since the digits of a count total are counted in the order of most significant to least significant digit, the variable counters need only be enabled in sequence, and once enabled, they need not be disabled. The reason for this is that once the system has counted to the preset thousands digit of the preset count total, the variable magnetic counter 40*t* cannot produce another output pulse before the preset count total is attained. For the same reason, once variable counter 54*h* has counted the preset hundreds digit of the preset count total, it cannot again produce an output pulse before the preset count total is attained. Finally, variable counter 40*t* develops an output when the system has counted the preset tens digit of the preset count total and cannot produce another output before the preset units digit is counted. Consequently, additional control circuit elements are not required to sequentially disable the fixed and variable magnetic counters once they have been enabled. This results in a substantial saving in components and a substantial reduction in production costs.

It will be seen that if the thousands digit of the preset count total is zero, the switch arm 55*th* of the switch 52*th* contacts the 0 contact. Consequently, the first pulse from pulse source 20 is routed through this switch 52*th* and through the other switches 52 to set the flip-flop 48 in the count stage counting the next most significant non-zero digit of the count total. Thus, if the units digit is the only non-zero digit in the count total, the first pulse from the pulse source 20 is routed through each of the four switches 52 to the set input of flip-flop 48*u*; the thousands, hundreds and tens count stages being effectively by-passed. In the same manner, if one of the lower order digits of the preset count total is a zero, the switch 52 of the count stage assigned to count that particular order digit is effectively by-passed. Specifically, if the hundreds digit of the preset count total is zero, the output developed by the variable counter 40*th* when the thousands digit is counted, is routed through switch 52*h* to the next lower order count stage which has been preset to count a non-zero digit. In the situation where the lowest order or units digit of the preset count total is zero, the output developed by the variable counter 40*t* when the tens digit is satisfied is routed through the switch 52*u* to the output terminal 57 for application to the terminating module 70.

It will thus be seen that the switches 52 serve the dual purpose of controlling the variable counters 40 to enable them in sequence and of routing the system output pulse to the terminating module 70 when lower order digits of the preset count total are zeros.

It will be appreciated that my invention may be applied to a high count system employing fixed and variable counters other than incremental magnetic counters. Although the disclosed embodiment of my invention operates on the basis of the decimal numbering system having a radix of ten, other numbering systems having different radices can be used. Inasmuch as the multi-position switches 52 have only two significant switch positions according to whether the count modulus of the count stage variable counter is zero or not zero, the switches need only have two contacts rather than the disclosed zero through nine contacts.

In the disclosed embodiment, conventional flip-flops are used to control the selective enabling of the variable counters to count the digits of the count total. It will be appreciated that other forms of electronic switching devices may be used to perform the same function. An electronic switching device ideally suited for this purpose is the latching circuit disclosed in the copending application of Klaus Wallentowitz for "Electronic Timer Circuit," Serial No. 405,503, filed October 21, 1964, and assigned to the assignee of the present application. This latching circuit is preferably employed in conjunction with modified counter interstage circuitry as disclosed in the application of Lundin and Bosman for "Electronic Switching Circuits For Counters," filed concurrently herewith and assigned to the assignee of the instant application. These copending applications are incorporated herein by reference. The AND gates 44, disclosed herein, are preferably formed as a part of the modified counter interstage circuitry disclosed in the above-noted Lundin and Bosman application.

The high count system of the present invention may be modularized in the manner shown in the drawing. That is, with the cascaded fixed counters forming the counting chain module 10. The variable count modules 12 through 18 are then connected to the counting chain module 10 to form a high count system. Alternatively, the components may be modularized as counting stage modules. In this situation, the pulse former 26*u*, the flip-flop 48*u*, the variable counter 40*u* and switch 52*u* are interconnected to form a units count stage module. Then, a decade counter 30, a flip-flop 48, a variable counter 40 and a switch 52 are interconnected to form an adder count stage module to count the next higher order digit. The number of adder count stage modules cascaded with the units count stage determines the count capacity of the system. Alternatively, the pulse former 26*u* may be formed as a separate module. Each additional module then incorporates a decade counter and a variable counter. The variable counter of each module is connected to receive the pulse outputs from the decade counter in the preceding cascaded module; except for the first module wherein the variable counter is connected to the output of the separate pulse former module. However, in this form of modularization, the fixed counter of the last cascaded module is not used.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing should be interpreted as illustrative and not in a limiting sense.

Having described my invention, what I claim as new and desire to secure by Letters Patent is:

1. A selectable count counter for providing an output upon the attainment of a preselectable total multi-digit count comprising, in combination:
- (A) a plurality of fixed and variable counters,
  - (1) said fixed counters connected in iterative series to provide a fixed count output upon the attainment of a total fixed count equal to the fixed counts of said fixed counters multiplied together,
  - (2) each of said variable counters having an input selectively responsive to the output of one of said fixed counters, and;
- (B) control means responsive to said fixed count output to cause said variable counters to successively and individually count the digits of the preselected total count in reverse order beginning with the highest order digit and progressing to the lowest order digit,
  - (1) said control means comprising electronic switch means and a single pole double throw switch for effecting counting by said variable counters in said reverse order.

2. A selectable count counter for providing an output upon the attainment of a preselectable total multi-digit count comprising, in combination:
- (A) a plurality of fixed and variable counters,
  - (1) said fixed counters connected in iterative series to provide a fixed count output upon the attainment of a total fixed count equal to the fixed counts of said fixed counters multiplied together,
  - (2) each of said variable counters having an input selectively responsive to the output of one of said fixed counters;
- (B) control means responsive to said fixed count output to cause said variable counters to successively and individually count the digits of the preselected total count beginning with the highest order digit and progressing to the lowest order digit; and
- (C) means for simultaneously disabling all of said variable counters prior to the beginning of a counting operation.

3. A selectable count counter for providing an output upon the attainment of a preselectable total multi-digit count comprising, in combination:
- (A) a plurality of fixed and variable counters,
  - (1) said fixed counters connected in iterative series to provide a fixed count output upon the attainment of a total fixed count equal to the fixed counts of said fixed counters multiplied together,
  - (2) each of said variable counters having an input selectively responsive to the output of one of said fixed counter; and,
- (B) control means,
  - (1) responsive to the first count supplied to said counter to render the highest order variable counter responsive to the highest order fixed counter, and
  - (2) responsive to said highest order variable counter output to enable the next lower order variable counter and so forth to successively and individually count the digits of the preselected total count beginning with the highest order digit and progressing to the lowest order digit.

4. The counter defined in claim 3 wherein said control means comprises a plurality of switching devices each controlling the connection of one of said variable counters to one of said fixed counters.

5. The counter defined in claim 3 wherein said control means comprises a plurality of single pole double throw switching devices each controlling the connection of one of said variable counters to one of said fixed counters; the single pole of each of said switching devices being connected to the output of the next higher order variable counter and to one contact of the switching devise of the next higher order count stage.

6. The counter defined in claim 5 wherein the single pole of said switching device controlling the highest order variable counter is connected to the source of pulses to be counted.

7. The counter defined in claim 6 wherein one contact of the switching device controlling the lowest order variable counter is connected to provide said total count output signal.

8. The counter defined in claim 5 wherein one contact of the switching device controlling the lowest order variable counter is connected to provide said total count output signal.

9. The counter defined in claim 3, and:
- (C) means for simultaneously disabling all of said variable counters.

10. The counter defined in claim 9 wherein said last named means is responsive to the output supplied by the counter upon the attainment of a preselected count to simultaneously disable all of said variable counters.

11. A system for counting to a multi-digit count total, said system comprising, in combination:

(A) a plurality of fixed counters,
  (1) said fixed counters connected in iterative serial order such that the output of one is supplied to the input of the next,
  (2) each fixed counter providing a digit count output corresponding to a different order digit of said multi-digit count total;
(B) a plurality of variable counters each selectively responsive to the output of one of said fixed counters so as to count digit count outputs therefrom,
  (1) the count modulus of each said variable counter selectively adjustable to preselect the order digit of the count total each variable counter is to count,
  (2) each said variable counter providing an output when it has counted a corresponding order digit;
(C) control means,
  (1) operating to enable each variable counter in response to an output supplied from the variable counter counting the next higher order digit of said multi-digit count total, and
  (2) maintaining each variable counter so enabled while lower order digits of said count total are counted in sequence by other variable counters,
  (3) said control means operating to disable all of said variable counters prior to a count operation.

12. The system defined in claim 11 wherein said fixed and variable counters are incremental magnetic counters.

13. The system defined in claim 12 wherein said interconnected fixed counters form a first module, and one of said variable counters together with one of said control means forms a second module, said system being comprised of one of said first modules and at least two of said second modules.

14. A system for counting to a multi-digit count total, said system comprising, in combination:

(A) a plurality of fixed counters,
  (1) said fixed counters connected in iterative serial order such that the output of one is supplied to the input of the next,
  (2) each fixed counter providing a digit count output corresponding to a different order digit of said multi-digit count total;
(B) a plurality of variable counters selectively responsive to the output of one of said fixed counters so as to count digit count outputs therefrom,
  (1) the count modulus of each said variable counter selectively adjustable to preselect the order digit of the count total each variable counter is to count,
  (2) each said variable counter providing an output when it has counted a corresponding order digit;
(C) a plurality of first switching means,
  (1) each said first switching means operating to operatively connect one of said variable counters to the output of a fixed counter in response to an output supplied from the variable counter counting the next higher order digit of said multi-digit count total,
  (2) to maintain said one variable counter so connected while lower order digits of said count total are counted in sequence by other variable counters and
  (3) all said first switching means operating in unison to disconnect all of said variable counters from the outputs of their corresponding fixed counters prior to a count operation;
(D) a plurality of second switching means,
  (1) each said second switching means operating to route said output from the variable counter counting the next higher order digit to said one of said first switching means.

15. The system defined in claim 14 wherein said fixed and variable counters are incremental magnetic counters.

16. A system for counting to a selectably preset total number of pulses generated by an electrical pulse source and thereupon generate a count total output signal to a utilization device, said system comprising, in combination, (A) a plurality of count stages connected in cascade to count each digit of said total number in sequence from highest order to lowest order digit, each said count stage respectively comprising,
  (1) a fixed counter permanently connected in iterative serial order with the fixed counters of all other count stages to provide digit count outputs of a particular order digit of said total number,
  (2) a variable counter selectably connectable to the output of said respective fixed counter to count said digit count outputs therefrom,
    (a) the count modulus of said variable counter being adjustable to be equal to said particular order digit,
    (b) said variable counter providing an output signal in response to receipt of digit count outputs from said fixed counter equal to its preset count modulus,
    (c) said variable counter of the lowest order digit stage of said system supplying its output as a count total output signal to the utilization device,
  (3) bistable electronic switch means having,
    (a) a first input terminal to which an input is applied to switch said electronic switch means to a first condition effecting connection of said variable counter to the output of said respective fixed counter, and
    (b) a second input terminal to which an input is applied to switch said electronic switch means to a second condition effecting disconnection of said variable counter from the output of said respective fixed counter,
    (c) said electronic switch means, once switched to its first condition, remaining in its first condition for the duration of a count operation,
  (4) switch means having
    (a) a first switch condition effective to convey an output from a variable counter in a higher order count stage to the first input terminal of said respective electronic switch means when said variable counter of its count stage is preset to count a non-zero digit,
    (b) a second switch condition effective to convey an output from a variable counter in a higher order count stage to the first input terminal of an electronic switch means in a lower order count stage when said respective variable counter is preset to count a zero digit,
    (c) the switch means of the highest order count stage operating to convey at least one pulse from the pulse source to the first terminal of the electronic switch means in a count stage adapted to count the highest order non-zero digit of said total number,
    (d) the switch means of the lowest order count stage operating in its second condition to convey the output from a variable counter in the next higher order count stage adapted to count a non-zero digit to a utilization device.

17. The system defined in claim 16 wherein each said count stage further includes, (5) an input terminal commonly connected to receive an input signal for application to the second input terminal of said electronic switch means so as to simultaneously disconnect all variable counters from the outputs of their respective fixed counters prior to the beginning of each count operation.

18. The system defined in claim 17 wherein said fixed and variable counters are incremental magnetic counters.

19. A system for counting a selectably preset total number of pulses generated by an electrical pulse source and thereupon generating a count total output signal to a utilization device, said system comprising, in combination:

(A) a units count stage for counting the units digit of said total number, said units count stage respectively comprising, (1) a fixed counter having, (a) an input connected to receive pulses from said pulse source, and (b) an output developing a count output, (2) a variable counter selectably connectable to the output of said fixed counter to count units digit count outputs therefrom, (a) the count modulus of said variable counter being adjustable to be equal to said units digit, (b) said variable counter providing an output signal supplied to said utilization device as a count total output signal in response to the receipt of a number of digit count outputs from said fixed counter equal to its count modulus, (3) bistable electronic switch means having, (a) a first input terminal to which an input is applied to switch said electronic switch means to a first condition effecting connection of said variable counter to the output of said fixed counter, and (b) a second input terminal to which an input is applied to switch said electronic switch means to a second condition effecting disconnection of said variable counter from the output of said fixed counter, (4) switch means having, (a) a first switch position when said units digit is other than zero, and (b) a second switch position when said units digit is zero (i) said second switch position effective to convey a count total output signal to said utilization device, and (B) a higher order count stage cascaded with said units count stage for counting each higher order digit of said total number, each said higher order count stage respectively comprising, (1) a fixed counter having, (a) an input permanently connected to receive the output from the fixed counter in the next lower order count stage, and (b) an ouput providing a digit count of a particular digit in said total number, (2) a variable counter selectably connectable to the output of said respective fixed counter to count digit count outputs therefrom, (a) the count modulus of said variable counter being adjustable to equal a particular higher order digit, (b) said variable counter providing an output in response to the receipt of the number of digit count outputs from said respective fixed counter equal to its preset count modulus, (3) bistable electronic switch means having, (a) a first input terminal to which an input is applied to switch said electronic switch means to a first condition effecting connection of said variable counter to the output of said fixed counter, and (b) a second input terminal to which an input is applied to switch said electronic switch means to a second condition effecting disconnection of said variable counter from the output of said fixed counter, (4) switch means having, (a) a first switch position effective to convey an output from the variable counter in a higher order count stage to the first input of said electronic switch means when said respective variable counter is preset to count a non-zero digit, (b) a second switch position effective to convey an output from the variable counter in a higher order count stage to the first input terminal of electronic switch means in a lower order digit count stage when said respective variable counter is preset to a zero digit, (c) the switch means of the highest order count stage operating to convey at least one pulse from said source to the first input terminal of the electronic switch means in the count stage adapted to count the highest order non-zero digit of said count total at the beginning of a count operation.

References Cited

UNITED STATES PATENTS

| | | | |
|---|---|---|---|
| 2,889,987 | 6/1959 | Marcus | 235—92 |
| 2,999,207 | 9/1961 | Quynn | 235—92 |
| 3,156,814 | 11/1964 | Neitzert | 235—92 |
| 3,226,562 | 12/1965 | Neitzert | 235—92 |
| 3,324,456 | 6/1967 | Brown | 235—92 |

MAYNARD R. WILBUR, *Primary Examiner.*

G. J. MAIER, *Assistant Examiner.*